United States Patent
Mower et al.

(10) Patent No.: US 7,496,080 B1
(45) Date of Patent: Feb. 24, 2009

(54) SYSTEM AND METHOD FOR PRIORITY COMMUNICATION MANAGEMENT IN A HYBRID TDMA-SS SYSTEM

(75) Inventors: Vaughn L. Mower, Bountiful, UT (US); Merle L. Keller, Salt Lake City, UT (US); Zachary C. Bagley, Salt Lake City, UT (US)

(73) Assignee: L-3 Communications, New York, NY (US)

( * ) Notice: Subject to any disclaimer, the term of this patent is extended or adjusted under 35 U.S.C. 154(b) by 1057 days.

(21) Appl. No.: 10/619,864

(22) Filed: Jul. 14, 2003

(51) Int. Cl.
*H04B 7/212* (2006.01)
*H04B 7/216* (2006.01)
*H04L 12/403* (2006.01)
*H04L 12/43* (2006.01)
*H04J 3/02* (2006.01)

(52) U.S. Cl. .................. 370/347; 370/335; 370/455; 370/458; 370/461; 370/462; 370/337; 370/342

(58) Field of Classification Search ......... 370/320–330, 370/310, 345, 347–350, 441–444, 458–459, 370/461–462, 312–314, 512, 341–342, 412–418, 370/432, 509, 470–471, 280, 336, 455; 455/3.02–3.03, 455/7, 455, 416–417, 427–428, 431, 436, 455/450–451, 13.1–13.2, 412.1, 452.1–452.2, 455/453, 466, 516–521, 550.1, 556.2, 560–561, 455/11.1, 12.14, 35.3, 59, 435.1–435.3, 509–512, 455/166.2, 168.1; 375/131, 140, 148, 150
See application file for complete search history.

(56) References Cited

U.S. PATENT DOCUMENTS

| | | | |
|---|---|---|---|
| 6,763,240 B1* | 7/2004 | Chambers et al. | 455/466 |
| 6,781,971 B1* | 8/2004 | Davis et al. | 370/329 |
| 6,847,619 B2* | 1/2005 | Zscheile et al. | 370/322 |
| 6,847,626 B1* | 1/2005 | Carneal et al. | 370/345 |
| 2001/0036020 A1* | 11/2001 | Nelson et al. | 370/503 |
| 2002/0167959 A1 | 11/2002 | Zscheile, Jr. et al. | |
| 2003/0108090 A1* | 6/2003 | Giancola | 375/148 |
| 2003/0115369 A1* | 6/2003 | Walter et al. | 709/253 |

\* cited by examiner

*Primary Examiner*—Meless N Zewdu

(57) ABSTRACT

A method and system for managing Priority Messages in a hybrid TDMA-Spread Spectrum (TDMA-SS) communication system is provided. The method and system include a HUB for generating a HUB TDMA epoch, wherein the HUB TDMA epoch includes at least one Priority Message (PM) slot. The PM slot includes a plurality of assignable PM sub-slots. The method and system also include at least one SPOKE, wherein the at least one SPOKE is adapted to transmit a Priority Message during its assigned PM sub-slot within the HUB TDMA epoch.

17 Claims, 4 Drawing Sheets

SYSTEM AND METHOD FOR PRIORITY COMMUNICATION MANAGEMENT IN A HYBRID TDMA-SS SYSTEM

CROSS-REFERENCE TO RELATED APPLICATIONS

This application is related to copending Non-provisional U.S. patent application Ser. No. 10/334,191, filed Dec. 31, 2002, titled "Acquisition and Tracking of Burst Code Timing in a TDMA System Using a Parallel Correlator". The disclosure of this Non-provisional Patent Application is incorporated by reference herein in its entirety to the extent it does not conflict with the teachings presented herein.

This application is related to copending Non-provisional U.S. patent application Ser. No. 10/014,058 filed Dec. 6, 2001, titled "Method and System for Acquiring Pseudo-Noise (PN) Decade-Code Phase". The disclosure of this Non-provisional Patent Application is incorporated by reference herein in its entirety to the extent it does not conflict with the teachings presented herein.

This application is related to copending Non-provisional U.S. patent application Ser. No. 10/085,610 filed Feb. 26, 2002, titled "Epoch-Synchronous, Binary=Progressive Clock Generation for Direct Sequence Spread Spectrum Systems". The disclosure of this Non-provisional Patent Application is incorporated by reference herein in its entirety to the extent it does not conflict with the teachings presented herein.

This application is related to copending Non-provisional U.S. patent application Ser. No. 10/352,295 filed Jan. 27, 2003, titled "Method and System for Rapid Automatic Data Rate Discovery for PN Codes". The disclosure of this Non-provisional Patent Application is incorporated by reference herein in its entirety to the extent it does not conflict with the teachings presented herein.

BACKGROUND OF THE INVENTION

1. Field of the Invention

The present invention relates to spread spectrum (SS) communication systems using Pseudo-Noise (PN) coding techniques and, more particularly, to priority communication management in a hybrid TDMA-SS system.

2. Prior Art

Spread spectrum (SS) systems, which may be Code Division Multiple Access (CDMA) systems, are well known in the art. SS Systems can employ a transmission technique in which a pseudo-noise (PN) PN-code is used as a modulating waveform to spread the signal energy over a bandwidth much greater than the signal information bandwidth. At the receiver the signal is de-spread using a synchronized replica of the PN-code.

In general, there are two basic types of SS systems: direct sequence spread spectrum systems (DSSS) and frequency hop spread spectrum systems (FHSS).

The DSSS systems spread the signal over a bandwidth $f_{RF} \pm R_c$, where $f_{RF}$ represents the carrier frequency and $R_c$ represents the PN-code chip rate, which in turn may be an integer multiple of the symbol rate $R_s$. Multiple access systems employ DSSS techniques when transmitting multiple channels over the same frequency bandwidth to multiple receivers, each receiver sharing a common PN code or having its own designated PN-code. Although each receiver receives the entire frequency bandwidth, only the signal with the receiver's matching PN-code will appear intelligible; the rest appears as noise that is easily filtered. These systems are well known in the art and will not be discussed further.

FHSS systems employ a PN-code sequence generated at the modulator that is used in conjunction with an m-ary frequency shift keying (FSK) modulation to shift the carrier frequency $f_{RF}$ at a hopping rate $R_h$. A FHSS system divides the available bandwidth into N channels and hops between these channels according to the PN-code sequence. At each frequency hop time a PN generator feeds a frequency synthesizer a sequence of n chips that dictates one of 2n frequency positions. The receiver follows the same frequency hop pattern. FHSS systems are also well known in the art and need not be discussed further.

In general, although the original data stream is recovered, after PN acquisition, the actual data cannot be recovered, or extracted from the data stream until data-symbol boundaries are identified. Data-symbol boundaries are identified either with a symbol synchronizer (bit synchronizer, with its attendant acquisition and pull-in time), or with PN code epochs.

Time division multiple access (TDMA) is a communications system that divides a single frequency channel into short-duration time slots to enable multiple users to transmit on the same channel. Hybrid TD-Spread Spectrum (SS) or TDMA-SS transmission systems employ a succession of short-duration PN encoded data bursts emanating from one or more communication stations.

A TDMA structure is composed of a stream of frames with a number of fixed-time slots per frame. Each time slot may be of an assigned type: entry and registration, routine maintenance, priority messages, mass data transfer, et cetera. The composition of slot types in a frame may be reassigned from frame to frame. A time slot in a frame may be assigned to one specific user; or a time slot, such as an entry-type time slot, may be a free-for-all slot; where any number of users may attempt to use it on a first-come, first-server basis.

For example, one station designated as the HUB may assign a certain number of satellite stations, designated as SPOKES, certain time slots with in a given window within which to communicate with the HUB. Yet, there are times when a SPOKE may need to communicate with a receiver, in other words, a priority communication, outside of its assigned time slot. In some applications this is accomplished by reserving an unassigned time slot for priority interrupts, such as shown in U.S. patent application Ser. No. 2002/0167959. Thus, SPOKEs may transmit priority interrupts which may be received and acted upon by the HUB. However, since any SPOKE, if there are more than one, may transmit during the unassigned slot time there is a possibility of collision and lost data.

Certain classes of TDMA users require minimal time latency before their priority communication is received. However, since a Priority Time Slot occupies a full time slot, it can be seen that data/message latency increases if Priority Time Slots are assigned to specific users; a user is blocked from using a Priority Time Slot until that specific user's Priority Time Slot occurs. In another words, a user may have to wait until another available priority interrupt time slot is available to transmit its priority message.

It is therefore desirable to provide a TDMA system where priority interrupt time slots are managed to prevent collisions, and therefore subsequent loss of data. The purpose is to reduce TDMA priority data/message latency and eliminate collisions (of priority users that without assigned priority time slots would compete and possibly collide while attempting to use the same priority time slot). It is also desirable to provide a TDMA system where TDMA priority data/message time latency is reduced and collisions are eliminated.

SUMMARY OF THE INVENTION

The foregoing and other problems are overcome, and other advantages are realized, in accordance with the presently preferred embodiments of these teachings.

In accordance with one embodiment of the present invention a hybrid TDMA spread spectrum communication system is provided. The system includes a HUB for generating a HUB TDMA period coincident with a PN epoch, wherein the HUB TDMA epoch includes at least one Priority Message (PM) slot having at least one assignable Priority message sub-slot. The system also includes at least one SPOKE, wherein the at least one SPOKE is adapted to transmit a PM during its assigned PM sub-slot within the HUB TDMA epoch.

In accordance with another embodiment of the present invention a HUB PN Epoch TDMA waveform is provided. The HUB PN Epoch TDMA waveform includes a TDMA frame corresponding to a PN epoch. The TDMA frame also includes a plurality of TDMA access slots, wherein at least one of the plurality of TDMA access slots is designated as a Priority Message (PM) slot. The PM slot further comprises a plurality of assignable PM sub-slots.

The invention is also directed towards a method for priority communication management in a hybrid Time Division Multiple Access-Spread Spectrum (TDMA-SS) system. The method includes providing a HUB generating a TDMA frame corresponding to a PN epoch. Within the TDMA frame a Priority Message (PM) time slot is designated and sub divided into a plurality of assignable PM sub-divisions; each of the assignable PM sub-divisions are assigned to a Spoke.

In accordance with another embodiment of the present invention a method of managing transmitting Priority Message data from a plurality of SPOKEs to a HUB is provided. The method includes determining a Time Division Multiple Access (TDMA) frame and determining a Priority Message (PM) slot within the TDMA frame. The method also includes assigning at least one portion of the PM slot to one of the plurality of SPOKEs and transmitting PM data from each of the plurality of SPOKEs during its respectively assigned portion of the PM slot.

The invention is also directed towards a program storage device readable by a machine, tangibly embodying a program of instructions executable by the machine to perform a method for managing transmitting Priority Message (PM) data from a plurality of SPOKEs to a HUB. The method includes determining a Time Division Multiple Access (TDMA) frame and determining a Priority Message (PM) slot within the TDMA frame. The method also includes assigning at least one portion of the PM slot to one of the plurality of SPOKEs and transmitting PM data from each of the plurality of SPOKE during its respectively assigned portion of the PM slot.

BRIEF DESCRIPTION OF THE DRAWINGS

The foregoing aspects and other features of the present invention are explained in the following description, taken in connection with the accompanying drawings, wherein:

FIG. 3A is a weighting function in accordance with features of the present invention shown in FIG. 3.

DETAILED DESCRIPTION OF THE PREFERRED EMBODIMENT

As disclosed herein, the present invention describes a novel method and system for managing multiple priority interrupt slots in a hybrid TDMA-SS communications system.

Figure 1:
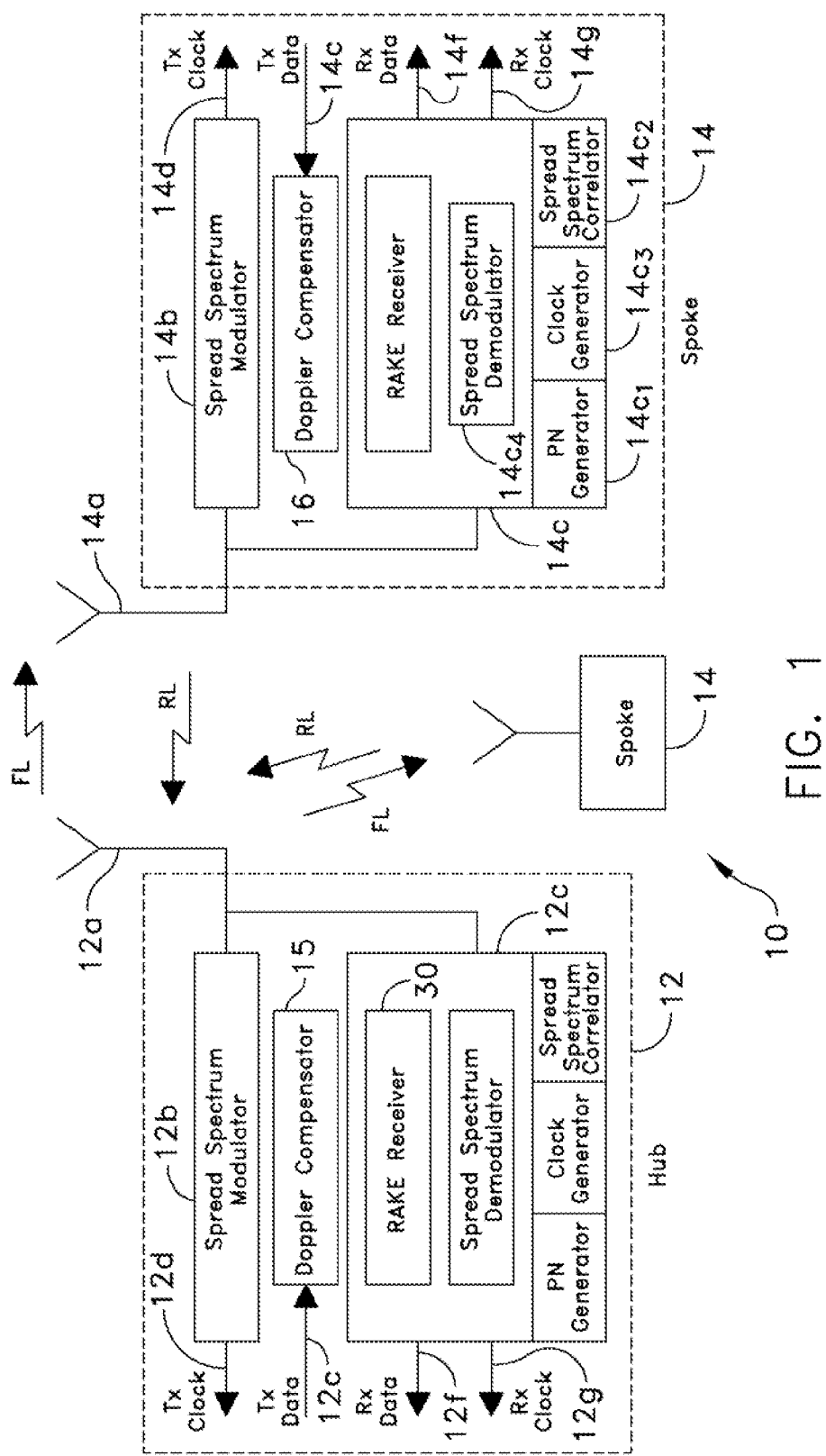
FIG. 1 is a pictorial diagram of a hybrid TDMA-SS incorporating features of the present invention.

Referring to FIG. 1, there is shown a pictorial diagram of a telecommunications system incorporating features of the present invention. Although the present invention will be described with reference to the embodiment shown in the drawings, it should be understood that the present invention might be embodied in many alternate forms of embodiments, e.g., point-to-point duplex links or point-to-multipoint links. In addition, it should be understood that the teachings herein may apply to any group or assembly of hybrid TDMA-SS receivers, including those that are fixed in place; vehicle mounted; and/or hand carried. As will be made clear, the invention includes waveform structure, link maintenance, and rapid acquisition.

Still referring to FIG. 1, there is shown a full-duplex system 10 that is suitable for practicing this invention. Specifically, the system 10 employs direct sequence spread spectrum based techniques over an air link to provide data transfer between HUB 12 and a SPOKE 14. It will be appreciated that there may be more than one Spoke. The forward link (FL) from HUB 12 to SPOKE 14 contains a spread spectrum waveform that is constructed in the manner described herein, with the PN code being composed of even-length and/or maximal length codes. In a similar manner, the return link (RL) from SPOKE 14 to HUB 12 contains a spread spectrum waveform that is similar, or identical, to that of the FL.

Still referring to FIG. 1, HUB 12 includes a Spread Spectrum Modulator (SSM) 12b; the SSM 12b generates a desired spread spectrum waveform at a desired RF frequency. The SSM 12b also provides a Tx clock 12d that is used to clock the Tx Data 12e into the SSM 12b. The SSM 12b then combines the Tx data 12e with a spread spectrum PN code to produce the desired spread spectrum waveform. HUB 12 also includes an antenna 12a, which may transmit at any suitable RF frequency.

The signal generated by HUB 12 and transmitted by antenna 12a via the FL is received by SPOKE 14 via antenna 14a. Spoke 14 includes a spread spectrum correlator 14c1, PN generator 14c2, clock generator 14c3, and spread spectrum demodulator (SSD) 14c4. The received signal is then demodulated by SSD 14c4. Once the signal is acquired and the SPOKE 14 is tracking the received signal, the Rx Clock 14g and Rx Data 14f are output to the intended receiver circuitry. It will be appreciated that the clocks 14g and 12d are synchronous and may be commanded to change frequency to correspond with PN code epochs as will be described herein; thus advantageously providing means to vary the data rate without interruption; and without the need for conventional bit synchronizers with associated synchronization time.

Similarly, SPOKE 14 generates a Tx Clock 14d and Tx Data 14e using the Spread Spectrum Modulator 14b in a similar fashion described earlier for a HUB. Likewise, HUB 12 may receive the RL signal via antenna 12a, and demodulate and track the signal as described earlier with receiver 12c to provide Rx Data 12f and Rx Clock 12g to the intended user.

Referring also to FIGS. 2A-2C there is shown block diagrams of a TDMA waveform showing Priority Managed (PM) time slot features in accordance with teachings of the present invention. Wildcard (acquisition and registration), Station Keeping (TEF included and described below), and Priority Managed time slots are shown in FIG. 2A. For illustration of PM sub-slot features of the present invention, six PM sub-slots per slot are depicted, however, in alternate embodiments any suitable number of PM sub-slots may be used. It will be appreciated that the higher density of sub-slots per slot (as compared to a single priority time slot per slot) allows more opportunities for SPOKEs to communicate priority messages, and reduces SPOKE data/message latency due to having to wait for an assigned priority message time slot. SPOKE collisions do not occur because priority sub-slots are Priority Managed by the HUB and assigned to specific SPOKEs.

Figure 2:
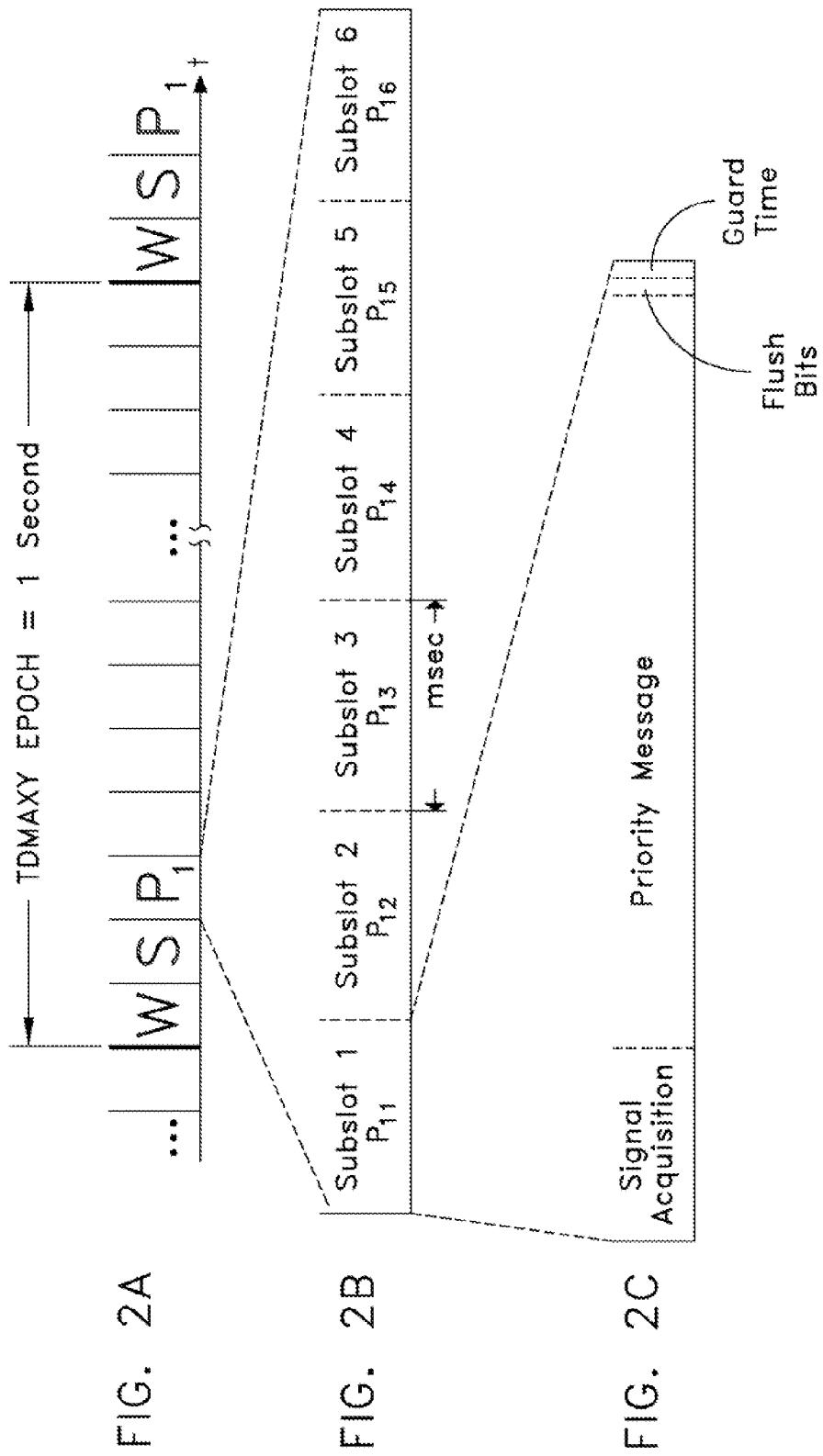
FIGS. 2A-2C are waveform diagrams of a TDMA waveform showing Priority Interrupt time slot features in accordance with teachings of the present invention shown in FIG. 1.

In a preferred embodiment of the present invention, multiple PM sub-slots per time slot, as shown in FIG. 2, between HUB 12 and one or more SPOKEs 14 (see FIG. 1) are managed by 1) SPOKEs 14 generating PN minor-epoch synchronous data (no bit synchronizer and data rates are synchronous with PN minor epoch(s)); and 2) HUB 12 and SPOKE(s) 14 executing fast Rake Receiver Acquisition and PN composite code phase maintenance.

SPOKE Generating Epoch-Synchronous Data

A SPOKE PN code sequence of the present invention is preferably comprised of three or more component codes: X, Y, Z1, Z2, ZN. A PN component code has a unique sequence of logic ones and zeros that repeats itself every length-of-its-code number of chips. The all-ones state of a component code is referred to as its epoch state. Thus, when two PN codes experience their epoch state on the same chip(time), such as XY or XY, the chip is identified as an epoch of the two PN codes. A PN code comprised of 3 component codes has six minor epochs (X, Y, Z, XY, XZ, and YZ) and one major epoch (XYZ) as taught in co-pending applications: Ser. No. 10/085,610, filed Feb. 26, 2002 and Ser. No. 10/352,295, filed Jan. 27, 2003.

In the present invention, the structure of the PN code is selected for advantageous symbol/bit synchronization. In this manner, when the data-synchronous PN epoch(s) is/are phase aligned by the HUB, data can be extracted by the HUB, or receiver, without the additional time expenditure of bit synchronization (acquisition and pull-in time). It will be further appreciated that more data rate choices are made available if more than one epoch event is used for symbol synchronization. In other words, if symbol boundaries are selected to fall on X-epoch-only boundaries and the X code were an even-length code (2n, for example), symbol rates are octave steps. For example, given a chipping rate of 32,672,640 chips/sec and an X-code length of 27 (128) chips, the possible data rates are 32,672,640÷{128 64 32 16 8 4 2 1}, which is n+1 (8) rates, where n is 7. For the case where the chipping rate is divided by 128 (255.255 Ks/s), one symbol is 128 chips long, and a single symbol begins and ends at contiguous X epochs. For the case where the chipping rate is divided by 1 (32.67264 Ms/s), one symbol is 1 chip long, and 128 symbols fall within contiguous X epochs.

Alternatively, if symbol boundaries are selected to coincide with XY-epoch boundaries, the multiplicands of the X-code length and the Y-code length can be used to generate the set of possible data rates. Using the previous example as with X-epoch-only synchronous data, let the Y-code length equal 255,255 chips, which is a $2^{18}-1$ (262,143 chips) PN code truncated to 255,255 chips. This PN code length has the following prime multiplicands: {1 3 5 7 11 13 17}. The additional 7 multiplicands of the Y code expand the number of data rates by 7. Fifty six data rates are now possible: $\{2^0\ 2^1\ 2^2\ 2^3\ 2^4\ 2^5\ 2^6\ 2^7\} \times \{1\ 3\ 5\ 7\ 11\ 13\ 17\}$, 56 products derived from one multiplicand from each set. The highest symbol rate is the same as the chipping rate, and the lowest symbol rate is 15.015 Ks/s (which is the chipping rate divided by 2176, which is the product of $2^7 \times 17$).

It will be readily appreciated that the PN-epoch data synchronization features of the present invention advantageously decreases the time required for bit synchronization and expands the set of possible data rates.

Referring again to FIGS. 2A-2C, it will be further appreciated that Priority Managed sub-slots $P_{11}$-$P_{16}$ may be arranged to begin after a predetermined amount of time referenced from the HUB PN epoch according to:

$$P_{nm}\_\text{start}=((Q-1)*\text{slot\_time})+((\text{sub\_slot\_Position}-1)*\text{Sub}\_{slot}\_\text{time}] \text{(Equation 1)}$$

where:
Q=Priority Managed slot position reference from HUB epoch
slot_time=nominal time duration of a slot
sub_slot_position=sub_slot position within Priority Managed Slot
sub_slot_time=normal time duration of a sub_slot.

In alternate embodiments of the present invention the Priority Managed sub-slots may be arranged to begin after a predetermined amount of time referenced from a PN minor epoch occurring within the HUB PN epoch. For example, as shown in FIG. 2A, a HUB epoch is bounded by the PN component code epoch XY. Within the XY epoch boundaries there are multiple X only epochs; or in other words a PN minor epoch with respect to the XY epoch. The Q variable in Equation 1 would then be: Priority Managed slot position referenced from a HUB minor epoch. FIG. 2C illustrates the priority message duration including Flush Bits that are required if forward-error correction (FEC) using convolutional encoding with constraint length 7. It will be appreciated that in alternate embodiments any suitable number of Flush bits corresponding to the coding scheme may be used, e.g., Turbo codes may not require Flush bits.

HUB Fast Acquisition

Figure 3:
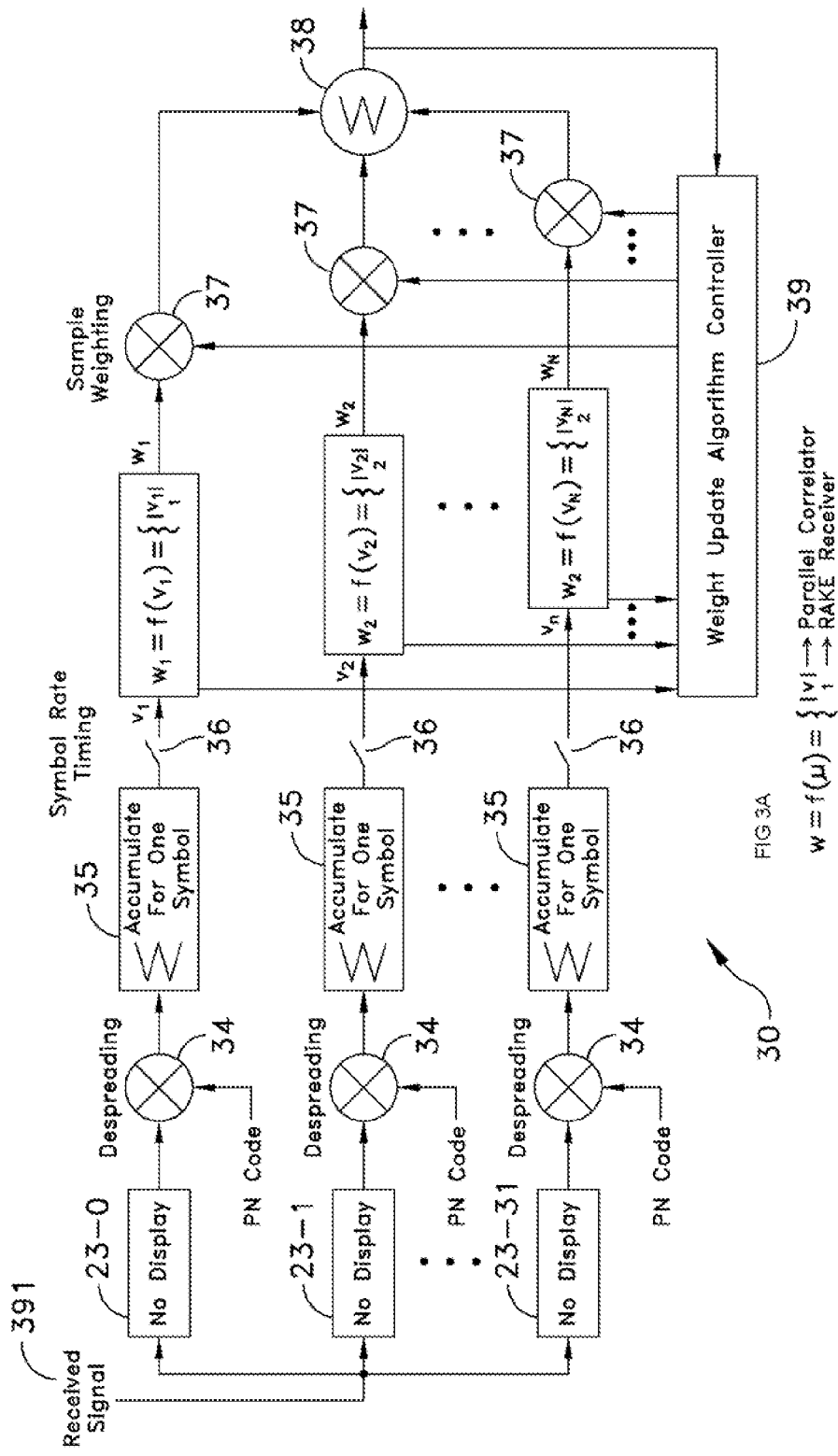
FIG. 3 is a block diagram showing parallel correlators (RAKE receiver) in accordance with fast acquisition features of the present invention shown in FIG. 1.

Referring also to FIG. 3 there is shown a RAKE receiver block diagram operated in accordance with the teachings of the present invention. Fast, near-instantaneous acquisition is accomplished by Rake Receiver 30, as depicted in FIG. 3. For purposes of illustration, the example of FIG. 3 shows 32 correlators (33-37) in parallel. In alternate embodiments Rake Receiver 30 may be any suitable number of parallel correlators (33-37). The depicted Rake Receiver 30 parallel processes 32 chips of the received PN encoded signal 391 via incremental chip delayers 33-0 through 33-31. Each chip delayer 33-0 through 33-31 delays the signal 39 by a incremental chip multiple from 0 to 31. In other words chip delayer 33-0 delays the signal by zero chips, i.e., no delay; chip delayer 33-1 delays the signal by 1 chips, chip delayer 33-2 delays the signal by 2 chips, and so on, to chip delayer 33-31, where the received signal is delayed by 31 chips. Each of the 32 delayed signals is then parallel despread with mixers 34 mixing the delayed signals with a local generated PN code. The despread signal is accumulated by accumulators 36 for one symbol; symbol rate timing switches 36 then sample the accumulated values. Weight generator 39 assigns a weight to each of the 32 signals via mixers 37, and summer 38 sums all of the weighted signals from mixers 37 to form a single output signal. Referring also to FIG. 3A, there is shown a weighting function: for parallel correlation function, the absolute value of the accumulated and sampled values (output of 36) is weighted and sampled. For Rake receiver, the absolute value is bypassed. It will be appreciated that all of the signals contribute to the summed output signal, and thus acquisition is accomplished without the more time consuming sequential PN search.

HUB/SPOKE PN Composite Code Phase Maintenance

For the Rake Receiver (FIG. 3, item 30) to acquire quickly, a SPOKE (FIG. 1) sending a priority message during its assigned priority managed sub-slot (see FIG. 2B), the SPOKE priority message is preferably received at the receiver within the uncertainty of the Rake Receiver's 30 uncertainty range (using the example of FIG. 3, the uncertainty preferably falls within the 32 chips of the Rake Receiver, which is ±16 chips of the Rake Receiver's 30 zero phase).

Referring again to FIG. 1 there is shown a pictorial diagram of a hybrid TDMA-SS incorporating HUB/SPOKE PN composite code phase maintenance features of the present invention, PN code uncertainty is kept within the Rake Receiver's range by: Timing Error Feedback (TEF) circuit(described below), Clock Correction circuit, and Reverse Doppler circuit.

Figure 4:
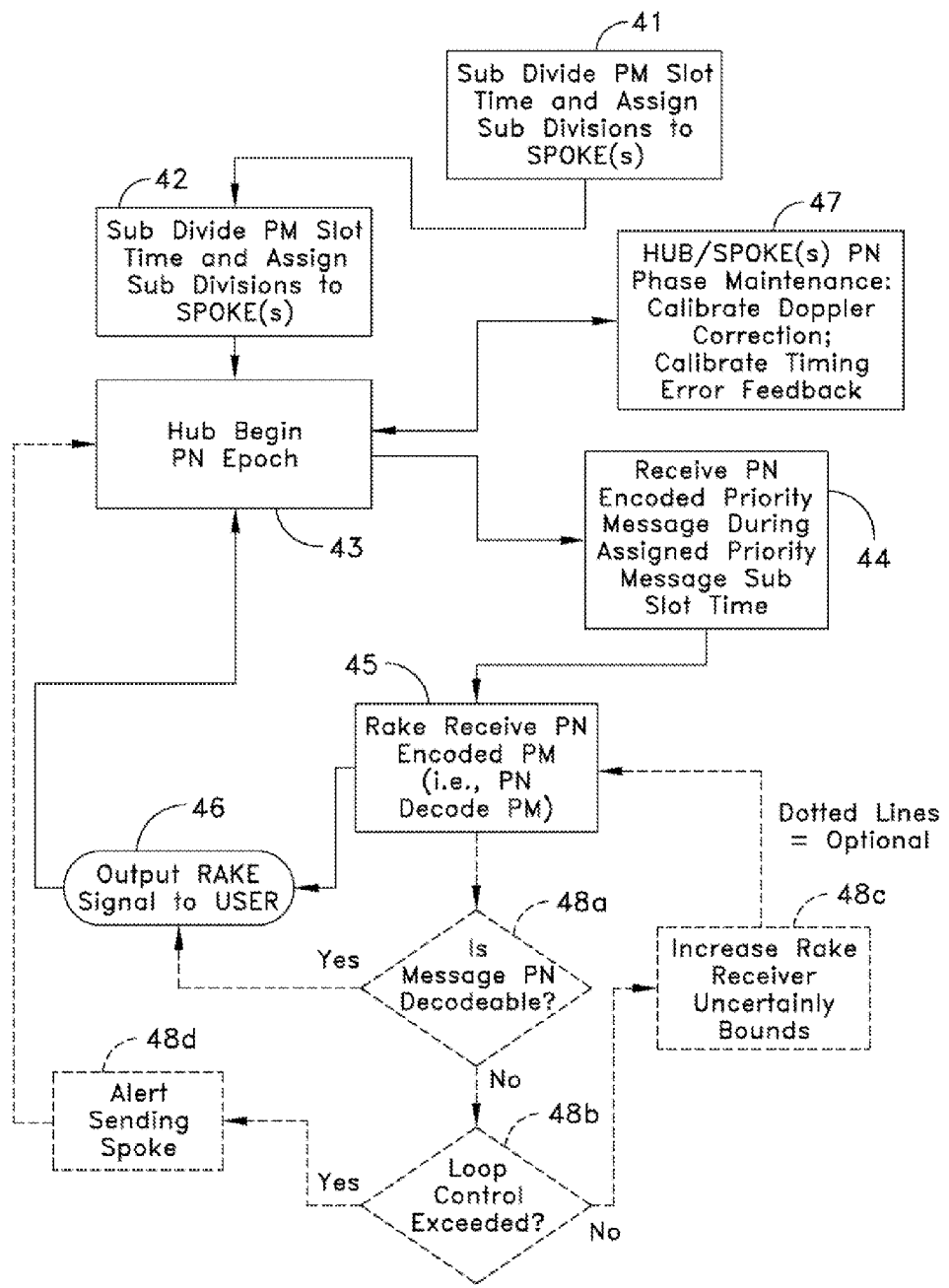
FIG. 4 is a method flow chart showing steps for one method implementing features of the present invention shown in FIG. 1.

Referring now to FIG. 4 there is shown a method flow chart showing steps for one method implementing features of the present invention shown in FIG. 1. Step 41 predetermines a Priority Message time slot position within a PN bounded epoch. Step 42 divides the Priority Message time slot according to the number of SPOKEs and assigns one or more of the Priority Message sub slots to one or more SPOKE users. Sub-slot assignment to a SPOKE may be any suitable assignment scheme such as one-to-one or many-to-one. In this manner, collisions are avoided since the Priority Message sub-slots are managed by a HUB and assigned to specific SPOKE(s). Step 43 begins a HUB epoch shown as TDMA XY epoch in FIG. 2A. It will be appreciated that the HUB epoch may be any suitable PN epoch.

Still referring to FIG. 4, step 44 receives a PN encoded Priority Message during an assigned Priority Message sub-slot time. Step 45 RAKE receives (i.e., PN decodes) the PN encoded message as described above. Step 46 outputs the PN decoded message to subsequent user circuitry.

FIG. 4, loop steps 48a-48d are optional. If the phase of the PN encoded signal received by RAKE receiver, step 45, exceeds the chip tolerance, or uncertainty range, of the RAKE receiver, step 48c increases the tolerance through the addition of parallel correlators as described above. The loop is re-executed until the PN signal is PN decoded or until Loop Control step 48b is exceeded.

Referring still to FIG. 4, in a preferred embodiment of the present invention a TDMA Station Keeping time slot, during normal HUB/SPOKE communications (see FIG. 2A), provides respective network station TEF for the respective HUB/SPOKE link, step 47. During the Station Keeping time slot (FIG. 2A, item S), PN code phase information is gathered by the HUB; the HUB records the phase position from its reference zero phase at which the received signal was acquired. This number, referred to as TEF, is reported to the sending SPOKE, which adjusts its PN code phase by the TEF amount so that thereafter its priority signal arrives at the HUB's PN zero phase. Because of imperfect Doppler compensation, imperfect clock correction, oscillator frequency shifts due to temperature gradients, and other factors, the PN code drift between a HUB and SPOKE persists, requiring that small TEFs constantly be reported to respective SPOKEs. In a preferred embodiment, therefore, one Station Keeping time slot per SPOKE per a predetermined number of seconds keeps the SPOKE TEF within a desired chip uncertainty of the HUB's PN zero phase, with subsequent PN sub-slot uncertainty maintained within a desired tolerance range. Thus, TEF keeps PN uncertainty from growing beyond the range of the Rake Receiver 30.

In addition, still referring to step 47, a SPOKE monitors its modulator and correlator delta PN code phase over an integration time period. Both FL, RL (see FIG. 1) experience the same integration time and the same separation in space (Doppler). The time difference between the two links FL, RL averaged over the time period results in a parts-per-part (seconds per second) clock accuracy coefficient. A SPOKE corrects its chipping rate, data rate, and nominal transmit frequency based on this coefficient. Thus, minimizing PN code difference between the HUB/SPOKE also minimizes the number of Station Keeping time slots, and a corresponding number of TEF values needed to maintain PN uncertainty within a Rake Receiver's (FIG. 3, item 30) range.

A SPOKE Doppler compensator (FIG. 1, item 16) also pre-compensates its transmit RF frequency and chipping rate according to the relative movement between it and the HUB. In this manner the HUB perceives that the received signal is sent from a stationary platform (i.e., the signal has little or no Doppler content). Thus, PN code phase difference due to Doppler effects are minimized.

It will be appreciated that an advantage of the present invention allows users of hybrid code division-multiple access/time division multiple access systems to receive priority time slot assignments, thereby eliminating collisions due to free-for-all competing for a priority time slot; while, at the same time reducing priority data/message latency because of a greater number of priority time slots available per time period.

It will be further appreciated that the invention described herein advantageously accomplishes minimal data/message latency while affording user-specific time slot assignments. By managing (assigning) Priority Time sub-slots, collisions are obviated.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A hybrid TDMA spread spectrum communication system, the system comprising:
 a HUB for generating a HUB TDMA epoch, wherein the HUB TDMA epoch comprises at least one Priority Message slot comprising at least one Priority message sub-slot; and
 at least one SPOKE, wherein the at least one SPOKE is adapted to transmit a Priority Message during the at least one Priority message sub-slot within the HUB TDMA epoch, wherein a symbol length of the Priority Message is adapted to coincide with a PN epoch.

2. The system as in claim 1 wherein the HUB further comprises:
  at least one HUB PN code generator for generating HUB PN codes; and
  at least one HUB rake receiver coupled to the at least one PN code generator, wherein the at least one HUB rake receiver is adapted to PN decode a PN encoded signal.

3. The system as in claim 2 where in the at least one HUB rake receiver comprises at least two parallel PN correlators.

4. The system as in claim 3 wherein the HUB further comprises:
  at least one HUB Doppler/Phase compensator coupled to the at least one HUB PN code generator, wherein the at least one HUB Doppler/Phase compensator is adapted to minimize PN phase difference between the HUB and the at least one Spoke.

5. The system as in claim 4 wherein the at least one HUB Doppler/Phase compensator comprises at least one HUB Time Error Feedback (TEF) circuit.

6. The system as in claim 1 wherein the at least one SPOKE comprises:
  at least one SPOKE PN code generator for generating SPOKE PN codes, wherein the SPOKE PN code generator is adapted to generate PN epochs; and
  at least one SPOKE Doppler/Phase compensator coupled to the at least one SPOKE PN code generator, wherein the at least one SPOKE Doppler/Phase compensator is RF coupled to the HUB Doppler/Phase compensator, and is adapted to minimize HUB/SPOKE PN phase difference.

7. The system as in claim 6 wherein the at least one Spoke Doppler/Phase compensator comprises at least one SPOKE Time Error Feedback (TEF) circuit.

8. The system as in claim 6 wherein the at least one SPOKE is adapted to generate a data rate clock in accordance with the PN epochs generated by the at least one SPOKE PN code generator.

9. A method for priority communication management in a hybrid Time Division Multiple Access-Spread Spectrum (TDMA-SS) system, the method comprising:
  providing a HUB, wherein providing the HUB further comprises providing a TDMA frame, wherein the TDMA frame corresponds to a PN epoch;
  designating a Priority Message (PM) time slot within the TDMA frame, wherein designating the PM time slot further comprises:
    sub-dividing the PM time slot into a plurality of PN sub-divisions; and
    assigning each of the plurality of PM sub-divisions to a Spoke.

10. The method as in claim 9 further comprising:
  receiving a SPOKE PN encoded Priority Message during one of the plurality of PM sub divisions; and
  parallel PN correlating the received PN encoded Priority Message.

11. The method as in claim 10 wherein parallel PN correlating the received PN encoded PM further comprises minimizing PN phase difference between the received PN encoded Priority Message and a PN code generated by the HUB.

12. The method as in claim 11 wherein minimizing PN phase difference further comprises:
  compensating for HUB/SPOKE Doppler effects; and
  compensating for HUB/SPOKE component variability.

13. A method for managing transmission of Priority Message data from a plurality of SPOKEs to a HUB, the method comprising:
  determining a Time Division Multiple Access (TDMA) frame;
  determining a Priority Message (PM) slot within the TDMA frame;
  assigning at least one portion of the PM slot to each of the plurality of SPOKEs;
  transmitting PM data from each of the plurality of SPOKES during its respectively assigned portion of the PM slot.

14. The method as in claim 13 wherein the TDMA frame comprises a PN epoch period.

15. The method as in claim 13 further comprising minimizing PN phase difference between each of the plurality of SPOKES and the HUB.

16. The method as in claim 15 wherein minimizing PN phase difference further comprises:
  receiving SPOKE data during a Station Keeping time slot, wherein receiving SPOKE data during the Station Keeping time slot further comprises;
  compensating for HUB/SPOKE Doppler effects; and
  compensating for HUB/SPOKE component variability.

17. A program storage device readable by a machine, tangibly embodying a program of instructions executable by the machine to perform a method for managing transmitting Priority Message data from a plurality of SPOKEs to a HUB, the method comprising:
  determining a Time Division Multiple Access (TDMA) frame;
  determining a Priority Message (PM) slot within the TDMA frame;
  assigning at least one portion of the PM slot to each of the plurality of SPOKEs;
  transmitting PM data from each of the plurality of SPOKES during its respectively assigned portion of the PM slot.

* * * * *